(No Model.)
L. NIEHAUS.
BRICK KILN.
No. 290,261. Patented Dec. 18, 1883.
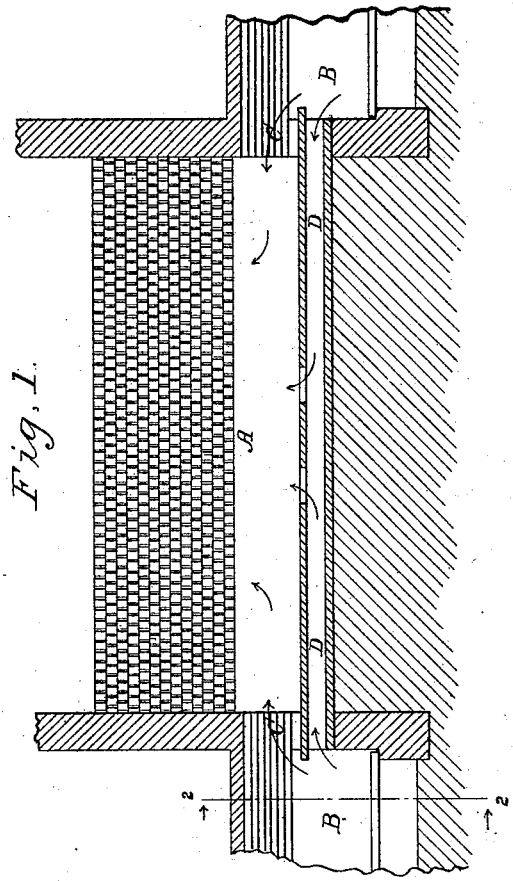
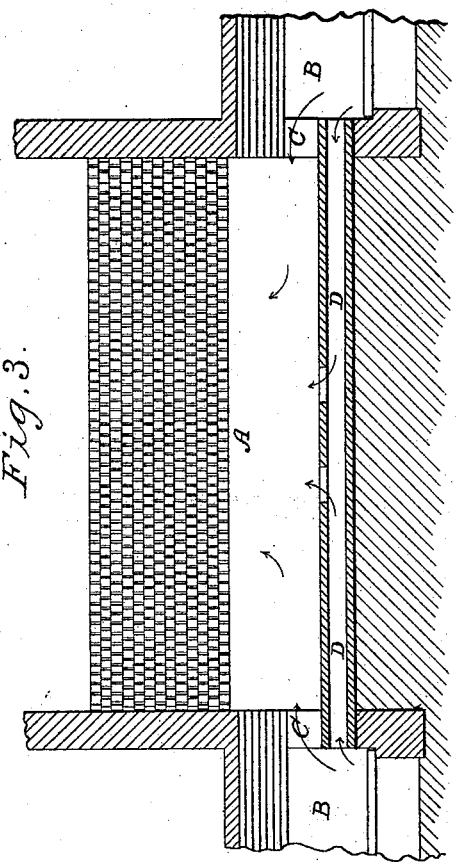
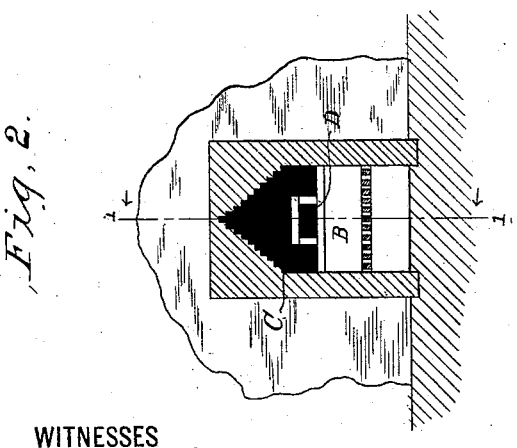
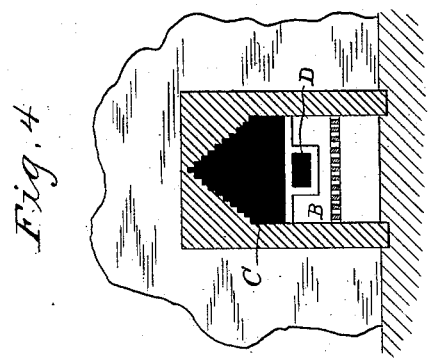
WITNESSES
Wm A. Skinkle
Henry A. Lamb
INVENTOR
Lambert Niehaus
By his Attorneys
Baldwin, Hopkins & Peyton

UNITED STATES PATENT OFFICE.

LAMBERT NIEHAUS, OF ST. LOUIS, MISSOURI.

BRICK-KILN.

SPECIFICATION forming part of Letters Patent No. 290,261, dated December 18, 1883.

Application filed October 20, 1883. (No model.)

*To all whom it may concern:*

Be it known that I, LAMBERT NIEHAUS, of the city of St. Louis and State of Missouri, have invented a certain new and useful Improvement in the Structure of Brick-Kilns, of which the following is a specification, reference being had to the accompanying drawings.

My improvement relates particularly to the class of brick-kilns described in United States Letters Patent of Wingard, No. 154,310, but is also applicable to other classes of brick-kilns in which there may be at one side of the kiln a furnace and an eye or flue to carry the products of combustion from the furnace into the kiln for distribution among the bricks to be burned. Ordinarily, such kilns are provided with furnaces on opposite sides and eyes or flues leading into them, the purpose being to distribute the heat as nearly uniformly as practicable throughout the kiln, and thus properly burn all of the bricks, or as many of them as practicable, contained in it.

In using brick-kilns of the Wingard class I have found in practice that the heat is not properly conducted to and distributed about the center of the kilns, and that the bricks in the center of the kilns are therefore not properly burned. If sufficient heat to properly burn the central portion of the kiln is admitted, the portions nearer the sides are too much burned, and a waste is created; in fact a uniform burning of the bricks is not secured in practice. Consequently I have conceived and put in practice with great advantage the idea of using a small flue in conjunction with the main eye or flue, by means of which small flue I deliver a portion of the products of combustion and heat from the furnace into or nearly to the center of the kiln before they begin to be distributed among the bricks of the kiln to be burned. The result is that a much larger per cent. of the bricks in the kiln, particularly those in the center of the kiln, are properly and uniformly burned, and the product of good bricks from the burning of a kiln is greatly increased.

In the accompanying drawings, illustrating my invention, Figure 1 is a central vertical section through one of the arches of a kiln and through the furnaces, eyes, and flues on opposite sides. Fig. 2 is a section on the line 2 2 of Fig. 1. Fig. 3 is a section similar to Fig. 1, except that it shows the flues in a lower position. Fig. 4 is a section similar to Fig. 2, except that the flue is shown in a lower position.

I will only describe in detail so much of a brick-kiln and its appurtenances as may be necessary to communicate a proper understanding of my improvement.

A indicates the body of the kiln; B, furnaces on opposite sides, and C eyes or flues for permitting the passage of the products of combustion from the furnace into the body of the kiln.

D indicates a special supplementary flue, composed of fire brick or tile, which may be placed within the eyes C or underneath the floor of the kiln. These small flues extend from the furnace into near the center of the kiln, where they open out into the body of the kiln, and permit the heat which they conduct to be delivered directly within or about the center of the kiln at its bottom, where it will be distributed and find its way up through the bricks in the usual manner. By thus subdividing the products of combustion and delivering a part of the heat directly into the center of the body of the kiln, it will be perceived that I get a more thorough and efficient action of the heat in that portion of the kiln, and a better burning of the bricks than I could otherwise accomplish.

I have illustrated two different positions for the supplementary small flues of fire-brick entering to the center of the kiln; but I have found in practice that the better position for these flues is within the eyes and arches of the kiln, instead of underneath the floor. The furnaces on the outside of the kiln are usually and preferably placed a little below the floor of the kiln, and thus the products of combustion tend naturally to enter the eyes and the small supplemental flues.

Having thus described my invention, what I claim as new, and desire to secure by Letters Patent of the United States, is—

The combination, with furnaces and the body of a brick-kiln inclosed in walls having eyes for the admission of the products of combustion from the furnaces, and with the ordinary horizontal openings through the body of the kiln along its bottom, for the general distribution of the products of combustion within the walls of the kiln, of small supplemental horizontal flues connecting directly with the furnaces, running within or parallel with the openings through the body of the kiln and at the bottom of the kiln, and dividing the products of combustion as they leave the furnace, so that part of them go into the eyes and part into the supplemental flues, from which latter they are delivered at about the center of the kiln, substantially as and for the purpose set forth.

In testimony whereof I have hereunto subscribed my name this 17th day of October, A. D. 1883.

LAMBERT NIEHAUS.

Witnesses:
GIDEON D. BAUTZ,
ANTHONY ITTNER.